United States Patent
Boser et al.

(10) Patent No.: US 11,680,799 B2
(45) Date of Patent: Jun. 20, 2023

(54) BANDWIDTH EXTENSION FOR CONTINUOUS MODE REVERSAL GYROSCOPE

(71) Applicant: THE REGENTS OF THE UNIVERSITY OF CALIFORNIA, Oakland, CA (US)

(72) Inventors: Bernhard Boser, Berkeley, CA (US); Burak Eminoglu, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 446 days.

(21) Appl. No.: 16/839,669

(22) Filed: Apr. 3, 2020

(65) Prior Publication Data

US 2020/0378763 A1    Dec. 3, 2020

Related U.S. Application Data

(63) Continuation of application No. PCT/US2018/055950, filed on Oct. 15, 2018.
(Continued)

(51) Int. Cl.
*G01C 19/5755*    (2012.01)
*G01C 19/5726*    (2012.01)

(52) U.S. Cl.
CPC ..... *G01C 19/5755* (2013.01); *G01C 19/5726* (2013.01)

(58) Field of Classification Search
None
See application file for complete search history.

(56) References Cited

U.S. PATENT DOCUMENTS 7,557,619 B1 * 7/2009 Dick ............... G06F 1/0328
                                            327/107
9,484,890 B1   11/2016 Cazzaniga
(Continued)

FOREIGN PATENT DOCUMENTS

KR    1020060017597 A    2/2006
WO       2015069359 A2    5/2015
WO       2019221774 A2   11/2019

OTHER PUBLICATIONS

ISA/KR, Korean Intellectual Property Office (KIPO), International Search Report and Written Opinion dated Dec. 12, 2019, related PCT international application No. PCT/US2018/055950, pp. 1-9, claims searched, pp. 10-15.

*Primary Examiner* — Paul M. West
*Assistant Examiner* — Mark A Shabman
(74) *Attorney, Agent, or Firm* — O'Banion & Ritchey LLP; John P. O'Banion

(57) ABSTRACT

A vibratory gyroscope system having a mechanical resonator (proof mass) and drive circuitry for maintaining oscillation in two axes at a small frequency split. Angular rate input is shifted to the frequency split and modulates both the frequency (FM) and the amplitude (AM) of the oscillations. Unlike other gyroscope modulation techniques which derive rate information from only the FM information and are subject to aliasing for rate signals with bandwidth exceeding the modulation frequency, the innovation uses both the FM and AM information. By exploiting their orthogonality, the image frequencies from the modulation cancel, thus removing the bandwidth limitation.

26 Claims, 7 Drawing Sheets

Related U.S. Application Data

(60) Provisional application No. 62/572,848, filed on Oct. 16, 2017.

(56) References Cited

U.S. PATENT DOCUMENTS

| | | |
|---|---|---|
| 9,846,055 B2 | 12/2017 | Boser |
| 9,869,553 B2 | 1/2018 | Boser |
| 2013/0104652 A1* | 5/2013 | Cazzaniga ......... G01C 19/5776 |
| | | 73/504.12 |
| 2014/0300425 A1* | 10/2014 | Cazzaniga ......... G01C 19/5726 |
| | | 331/154 |
| 2016/0003618 A1* | 1/2016 | Boser ..................... G01D 5/243 |
| | | 73/504.12 |
| 2016/0109258 A1* | 4/2016 | Boser ..................... G01C 25/00 |
| | | 73/504.12 |
| 2016/0202060 A1* | 7/2016 | Liu .................... G01C 19/5705 |
| | | 73/504.12 |
| 2018/0128674 A1* | 5/2018 | Kook ..................... G01H 13/00 |
| 2019/0219394 A1* | 7/2019 | Lin .................... G01C 19/5726 |

* cited by examiner

BANDWIDTH EXTENSION FOR CONTINUOUS MODE REVERSAL GYROSCOPE

CROSS-REFERENCE TO RELATED APPLICATIONS

This application claims priority to, and is a 35 U.S.C. § 111(a) continuation of, PCT international application number PCT/US2018/055950 filed on Oct. 15, 2018, incorporated herein by reference in its entirety, which claims priority to, and the benefit of, U.S. provisional patent application Ser. No. 62/572,848 filed on Oct. 16, 2017, incorporated herein by reference in its entirety. Priority is claimed to each of the foregoing applications.

The above-referenced PCT international application was published as PCT International Publication No. WO 2019/221774 A2 on Nov. 21, 2019, which publication is incorporated herein by reference in its entirety.

STATEMENT REGARDING FEDERALLY SPONSORED RESEARCH OR DEVELOPMENT

The invention was made with Government support under a grant awarded by the Department of Defense (DOD) Advanced Research Projects Agency (DARPA), number W31P4Q-12-1-0001. The Government has certain rights in the invention.

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

This invention pertains generally to frequency modulated vibratory gyroscopes, and more particularly to measurement bandwidth of MEMS gyroscopes.

2. Background Discussion

Gyroscopes allow for measuring or maintaining orientation, based on the principles of angular momentum. Gyroscopes can be implemented in a variety of ways, including mechanical, electronic, electromechanical construction (e.g., micro-electro-mechanical systems (MEMS)), and combinations thereof.

There is a wide range of applications for gyroscopes, including: inertial navigation, stabilization, or maintaining direction. A number of these gyroscope applications, such as navigation, require low offset. Measures of gyroscope offset include zero rate output (ZRO) and bias error. Although calibration can be utilized to cancel gyroscope offset, generally this error arises in response to environmental conditions, such as temperature and pressure which change over time, whereby periodic recalibration would be required. Recalibration in the field is not only an imposition to the user, but is further complicated by the challenge of subjecting the sensor to a known angular rate. For example, precision gyroscopes are affected by ambient pressure and temperature variations that corrupt the measured rate signal.

In prior work of the applicant, gyroscopes were disclosed utilizing a bias shifting method that modulates the bias error to a higher frequency where it can be removed by a filter. However, one drawback to that approach is that it limits usable signal bandwidth to less than the modulation frequency.

Accordingly, a need exists for a version of bias shifting mechanism that eliminates the bandwidth restriction, while retaining beneficial aspects of bias shifting. The present disclosure fulfills that need and provides additional benefits over previous technologies.

BRIEF SUMMARY

Systems and methods are described for extending the bandwidth of continuous mode reversal gyroscopes. The proof mass of the gyroscope is configured to move along at least two orthogonal axes, or a ring, hemisphere, or similar continuous structure which is free to vibrate in at least two orthogonal or independent modes or axes. Vibration of the mass can occur on these axes simultaneously, with frequencies determined by the natural frequencies of each axis. Angular rate is then inferred through a measurement of one or more of the axis oscillation frequencies and amplitudes.

Conventional gyroscopes determine angular rate based on amplitude modulation (AM), by measuring variations of transducer sense axis displacement (amplitude modulation) to determine angular input rate.

In prior work of the applicant, a gyroscope was described utilizing what could be termed a form of frequency modulation (FM), which determines angular rate based on variations of transducer vibration frequency in for example a quadrature or Lissajous FM mode of operation in which scale factor inaccuracy and rate random walk are significantly reduced. In addition, this previous work included utilizing a bias error shifting method which provided for shifting the bias error away from DC to a modulation frequency, where it could be removed by low pass filtering, to achieve significantly lower bias error. Yet one drawback to that approach was limiting signal bandwidth to below the modulation frequency.

The present disclosure overcomes previous bandwidth limitations in response to a method which makes use of both FM and AM information from the gyroscope transducer. Under certain conditions, by combining the FM and AM information, the spectral image components which limit signal bandwidth, can be eliminated from the rate determination.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

The FM gyroscope described in this disclosure utilizes a proof mass suspended by springs (of any desired type/implementation), with the proof mass being free to move along at least two orthogonal mechanical modes, as described in applicant's previous work in U.S. Pat. Nos. 9,869,553 and 9,846,055, both of which are incorporated herein by reference in their entireties. These two orthogonal mechanical modes are excited to vibrate simultaneously and are referred to in the description below as x and y modes.

Figure 1:
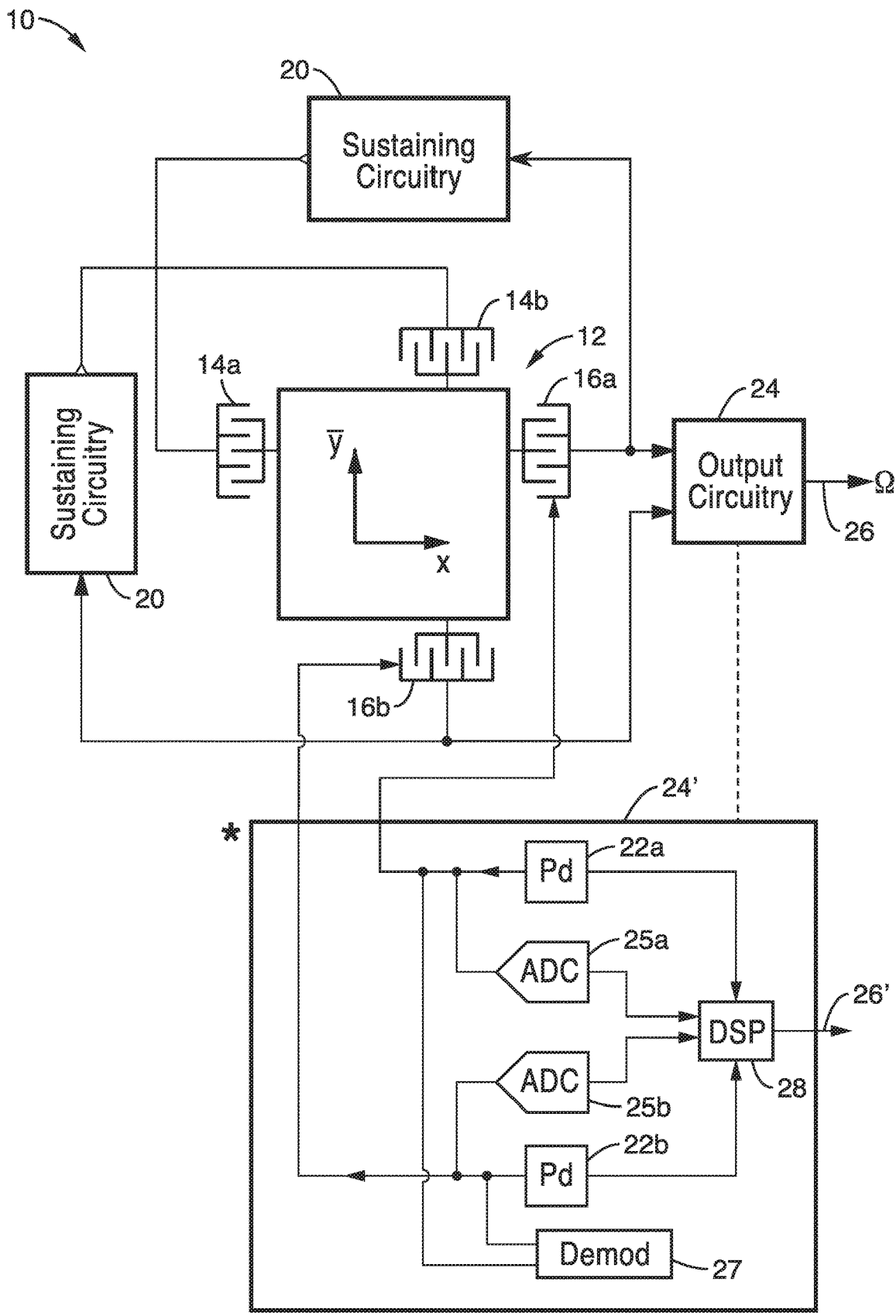
FIG. 1 is a block diagram of a gyroscope having the bandwidth extension circuitry according to the present disclosure.

FIG. 1 illustrates an example embodiment 10 of a direct frequency readout gyroscope system according to the presented technology. The gyroscope system 10 is shown with a mechanical resonator element 12 having sensing means 14a and 14b and actuating means 16a and 16b. Sustaining circuitry 20 is shown to mechanically excite the resonator at or near its natural frequencies and overcome resonator damping. Output circuitry 24 converts raw data from the gyroscope to a rate signal 26 to be utilized by the user application circuit.

It should be appreciated that in at least one embodiment of output circuitry 24 is configured 24' where signals 16a and 16b are digitized and angular rate is computed from these signals using a digital signal processor (DSP) 28. In at least one embodiment the conversion of 16a and 16b is accomplished by phase detection circuitry 22a and 22b (as detailed in FIG. 3) to digitize frequency and phase information (FM) and analog-to-digital converters (ADCs) 25a and 25b to digitize amplitude information (AM). A demodulator 27 is shown also coupled between inputs 16a, 16b and DSP 28 and provides the phase reference for demodulating the frequency and amplitude information.

The present disclosure requires that the natural frequencies differ by a small amount, typically in the range of 1 to 100 Hz. In at least one preferred embodiment, the resonator is symmetric with respect to the Coriolis coupled vibration modes. Accordingly, each Coriolis coupled vibration mode is preferably configured with identical sensing and actuating means, and the natural frequencies of the vibration modes are closely matching. The values of the desired natural frequencies and their difference can be set for example by precision manufacturing, or by trimming, or with a phase frequency control circuit which measures the natural frequencies and their differences and makes adjustments to the transducer 12.

Figure 2A:
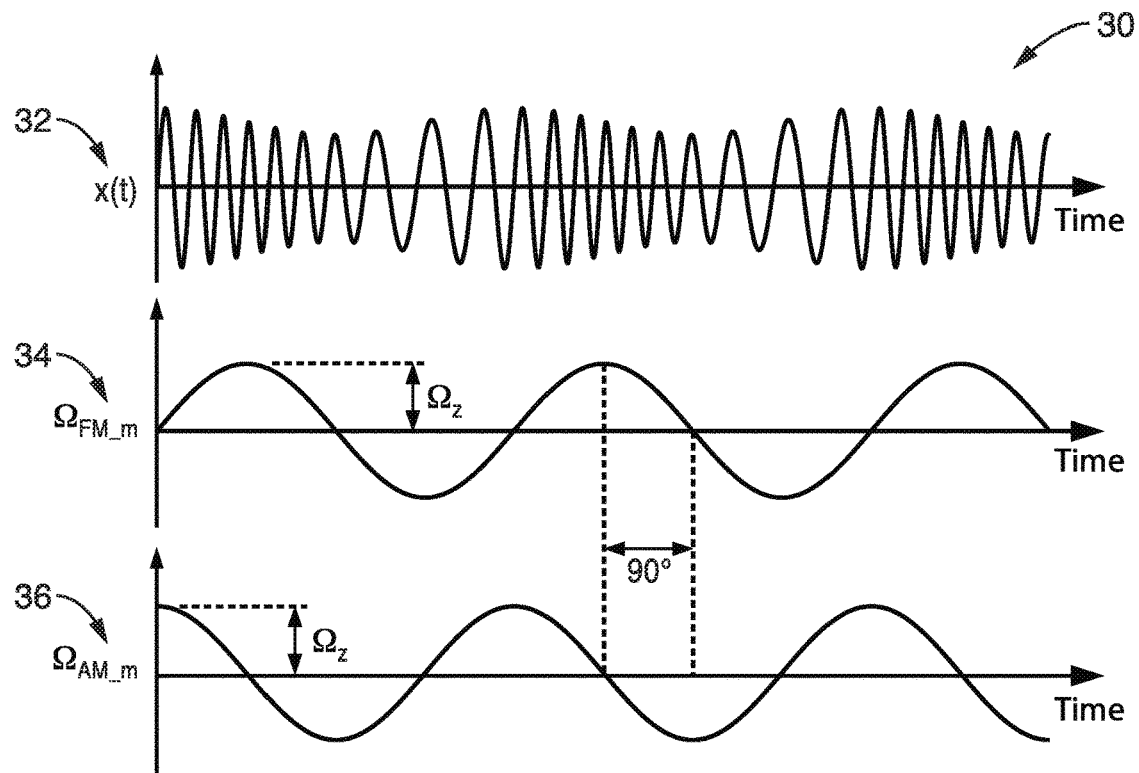
FIG. 2A and FIG. 2B are plots of intermediary gyroscope signals for a constant input rate as utilized according to an embodiment of the present disclosure.
Figure 2B:
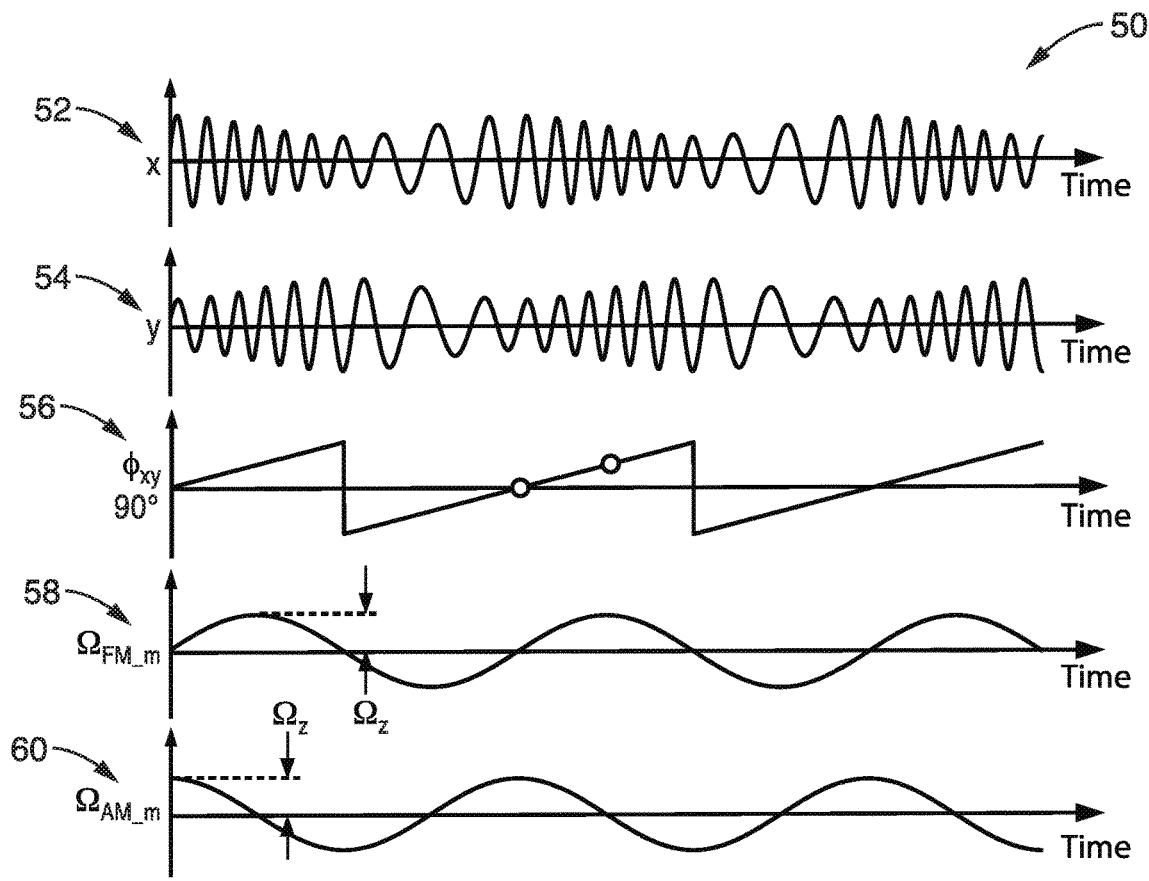

FIG. 2A and FIG. 2B illustrate example signals 30, 50. In FIG. 2A are seen displacements x(t) 32 along with the frequency $\Omega_{FM\_m}$ modulation 34 and amplitude modulation $\Omega_{AM\_m}$ 36 of 32 induced by angular rate signal $\Phi_z$. In FIG. 2B are shown displacements x(t) 52 and y(t) 54, for example as measured from circuit nodes 16a, 16b from FIG. 1 and the phase difference $\Phi_{xy}$ 56, and frequency $\Omega_{FM\_m}$ 58 and amplitude $\Omega_{AM\_m}$ 60 modulation of 56 and 58.

Displacements x(t) and y(t) can be understood as sinusoidal signals with varying amplitudes and phase $\phi_x$ and $\phi_y$. The phase difference $\Phi_{xy}=\phi_x-\phi_y$, determines the coupling between the modes: for $\Phi_{xy}=0$ or 180 degrees, respectively, such that rate in one mode modifies the amplitude of oscillation of the other mode. Likewise, for $\Phi_{xy}=90$ or 270 degrees, wherein rate in one mode modifies the phase of oscillation of the other mode. For illustration, FIG. 2A shows the displacement x(t) 32 for a constant rate as well as the variations of the frequency $\Omega_{FM\_m}$ 34 and amplitude $\Omega_{AM\_m}$ 36. These are modulated by the continually changing phase difference $\Phi_{xy}$, as shown in FIG. 2B. For example, for $\Phi_{xy}=0$ degrees (i.e., the zero crossings of x(t) and y(t) coincide) the change of amplitude is at a maximum while the frequency is unchanged. Conversely, for $\Phi_{xy}=90$ degrees (i.e., the zero crossing of y(t) coincides with the peak of x(t)) the change of frequency is at a maximum while the amplitude is unchanged. Rate can therefore be determined by measuring the instantaneous frequency and amplitude change of x(t) and y(t) and demodulating these signals with $\Phi_{xy}$. For the systems where the displacement amplitude is regulated with a feedback loop, the value of applied feedback forces can be used to extract the amplitude modulation $\Omega_{AM\_m}$ instead of using the amplitude of the displacement signals. This implementation is also less sensitive to the Q-factors and natural frequencies of the resonators.

It should also be appreciated that the present disclosure is based on utilizing a mechanical resonator (resonator 12 in FIG. 1) with at least two modes of vibration coupled by the Coriolis Effect. The resonator 12 is shown to have two modes of vibration along the x- and y-directions. A mode of vibration is defined as any number of independent mechanical deformations of the resonator, where the total deformation can be described as the sum of the deformations of the individual modes. A deformation should be understood as a continuous vector field which describes the mechanical displacement of each point of the resonator as a function of its position in three-dimensional space. Deformations are, in general, considered to be time varying. A resonator actuated upon by a forced deformation in a particular vibration mode will store a corresponding amount of strain energy. When released, the resonator will attempt to dissipate this strain energy. For a lossless resonator, the result of this action is a sinusoidal vibration of the resonator in that particular vibration mode. The inverse of the time it takes to complete one cycle of vibration is called the natural frequency of the vibration mode. The amplitude, or envelope, of the displacement vibration is defined as half the peak-to-peak displacement at an antinode of the deformation. An antinode is a position of maximum deformation of the particular vibration mode. The amplitude of the velocity of the vibration is equal to the oscillation frequency multiplied by the amplitude of the displacement vibration.

In order for the resonator to be sensitive to rate, the modes should be coupled by the Coriolis Effect. The Coriolis Effect is an effect observed in the rotating frame, whereby energy from one mode of the resonator is coupled into another mode of the resonator, such as from the x-axis to the y-axis, or between orthogonal modes, including from a first mode of vibration to a second mode of vibration. Modes that are coupled by the Coriolis Effect will occasionally be referred to as axes and given names which correspond to their direction of vibration in the rotating frame, such as the x-axis. The rotating frame is a frame of reference perceived by an observer of the resonator which is also rotating at the same rate as the resonator. Common mechanical resonators include pendulums, lumped mass-spring systems, rings, disks, and hemispheres.

Methods of operation will occasionally be described by the trajectory that a proof mass follows when using the particular mode of operation. These descriptions can only be literally interpreted for pendulum or lumped mass-spring systems, but an extension to rings, disks, and hemispheres can be understood in terms of combinations of independent vibrations of the modes. For example, a pendulum swinging at a 45 degree angle corresponds to equal amplitude, in-phase vibrations on both orthogonal modes. A circular pattern corresponds to equal amplitude oscillations of both orthogonal modes with a constant 90 degree phase difference.

The resonator includes means for transducing mechanical deformations into electrical signals (sensing) and for transducing electrical signals to mechanical deformations (actuating) for each mode of vibration. This is typically accomplished electrostatically through addition of electrodes forming either parallel plate or comb-type capacitors to the resonator. Other transducing means include piezoelectric, magnetic, or optical transducers.

The sustaining circuitry is connected to the resonator through sensing and actuating means. The frequency of oscillation observed and sustained by the sustaining circuitry depends on the input rotation rate, natural frequencies, and unwanted parasitic couplings. The dependence on input rate is introduced because the sensing and actuating means lie in the rotating frame. The frequency observed by the sustaining circuitry will be referred to as the oscillation frequency, which is different than the natural frequency.

In at least one embodiment, the sustaining circuitry for each mode comprises variable gain amplifiers (VGAs). Amplitude controllers adjust the gain of the VGAs in order to maintain a mechanical vibration of a particular amplitude. In this case the amplitude modulation $\Omega_{AM\_m}$ is equal to the control inputs the control inputs to the VGAs.

Figure 3:
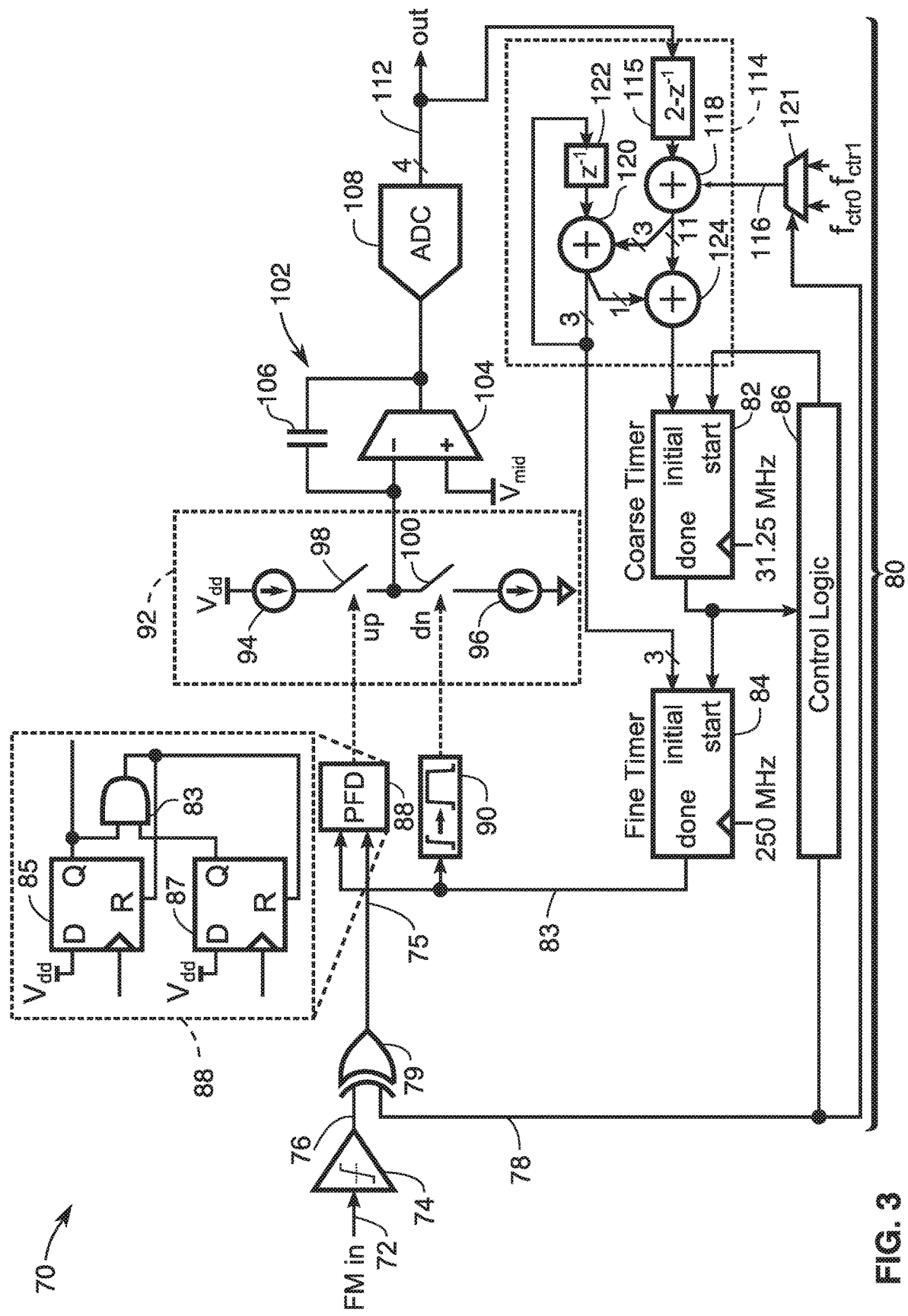
FIG. 3 is a schematic of a frequency demodulator utilized according to at least one embodiment of the present disclosure.

FIG. 3 illustrates an example embodiment 70 of a circuit for determining frequency modulation $\Omega_{FM\_m}$ of x and y. It should be appreciated that the circuit is shown by way of example and not limitation, as the present disclosure can be configured to operate with various circuitry which is available for determining frequency information from signals. Two of these circuits are used, one each for x(t) and y(t), as shown in FIG. 1 by 22a and 22b. Referring to FIG. 3 x(t), or y(t), is received at continuous-time comparator 74, which converts it to a square wave FM signal 76 for receipt by a delta-sigma frequency-to-digital converter (ΔΣFDC) 80. FM signal 76 is then processed by the exclusive-OR gate 79, which multiplies it by edge selection signal 78, thus resulting in a frequency-doubled signal 75 which is fed to the phase-frequency detector (PFD) 88. By way of example and not limitation, PFD 88 comprises two D-flip flops 85, 87 receiving signals 75, 83 at their clock inputs, and having their D inputs pulled up to $V_{dd}$, with Q outputs coupled through AND gate 83 to drive both reset (R) inputs.

Charge pump 92 includes switches 98 and 100 along with current sources 94 and 96, which outputs a pulse of charge proportional to the phase difference between signals 75 and 83. The output of the phase-frequency detector 88 controls switch 98, which enables current source 94. The fine timer 84 outputs a "done" signal 83 received by edge-to-pulse converter 90, which enables "down" switch 100 for a fixed period of time (e.g., 32 ns). The charge pulse is integrated by the active integrator 102 comprising operational transconductance amplifier 104 and feedback capacitor 106. The voltage across capacitor 106 is quantized by analog-to-digital converter 108, producing the digital output signal 112. This signal is fed to arithmetic block 114, which computes the values to be loaded into coarse timer 82 and fine timer 84. Output signal 112 is first processed by loop filter 115 upon which adder 118 adds a center frequency offset 116. The result is then split, with the least significant bits directed to adder 120, which together with register 122 comprises a digital integrator. The output of adder 120 is fed to fine timer 84 and to register 122. Adder 124 sums the most significant bits from adder 118 with the carry bit from adder 120, with the result coupled to coarse timer 82. Control logic block 86 generates edge selection signal 78, which is toggled after every phase comparison. This signal is used by XOR gate 79 to convert falling edges to rising edges, and is also used by multiplexor (mux) 121 to select one of two values for center frequency 116, which enables the loop to handle signals with an asymmetric duty cycle without requiring a large input frequency range. Output 112 of the ΔΣFDC 80 is a 2nd order sigma-delta modulated version of the input oscillation frequency. It is effectively a digital signal representative of the oscillation frequency which is preferably further processed by a DSP, ASIC, or FPGA to extract input angular rate, based on calculations.

To reduce power, the coarse timer (e.g., an 11-bit counter) 82 runs at a reduced clock rate, with correspondingly low time resolution. The coarse timer is used to enable a fine timer (e.g., a 3-bit counter) 84 near the time of the input edge. As an example, the coarse timer receives a clock with a period of 32 ns (31.25 MHz), while the fine timer receives a clock with a period of 4 ns (250 MHz). Because fine timer 84 effectively only delays the "done" signal of the coarse timer 82, it is necessary to integrate the timer input so that all future edges are delayed by the same amount. This is performed by a modulo integrator comprised of adder 120 and register 122. The carry bit is fed to adder 124, which adds one extra cycle of delay to the coarse timer when the modulo integrator wraps around.

In order to avoid nonlinearity due to mismatch between the up current 94 and down current 96, the down current source 96 is switched on using switch 100 for a constant duration (e.g., 32 ns) during every phase comparison cycle. The on-duration is set by pulse generator 90. The top current source 94 is switched on and off through switch 98. Current source 94 is switched on in response to output 83 from fine counter 84, which causes the output of D flip-flop 85 to go high. The rising edge of signal 75 produced by XOR gate 79 causes the output of D flip-flop 87 to go high; this causes the output of AND gate 83 to go high, resetting flip-flops 87 and 85 and turning off switch 98. Any mismatch between the two current sources 94 and 96 manifests itself as a static phase offset between signals 75 and 83; since the frequency demodulator measures the time derivative of phase, this offset is effectively eliminated and does not appear at the output 112.

While the delta-sigma frequency-to-digital converter (ΔΣFDC) is a preferred embodiment for frequency measurement due to its excellent linearity and scale factor accuracy, numerous other circuit architectures can be used in the present disclosure to extract rate information from the frequency-modulated signal. A conventional analog PLL can be used to demodulate FM, though scale factor stability and linearity is limited by the analog accuracy of the VCO. Another architecture which can be utilized comprises a slope discriminator followed by an envelope detector; this architecture is also subject to analog imperfections. Another possible implementation comprises a high-resolution analog-digital converter to directly digitize the sinusoidal signal from the oscillators, with the FM discrimination and further signal processing performed by a digital signal processor (e.g., comprising a programmable IC and/or a fixed-function application-specific integrated circuit (ASIC)). Another option is to measure the period of the FM signal directly, using either a high-resolution time-to-digital converter or a frequency counter. One of ordinary skill in the art will appreciate that various other methods of FM demodulation, or frequency measurement, may be alternatively utilized or adapted to work with the teachings of the present invention.

Figure 4:
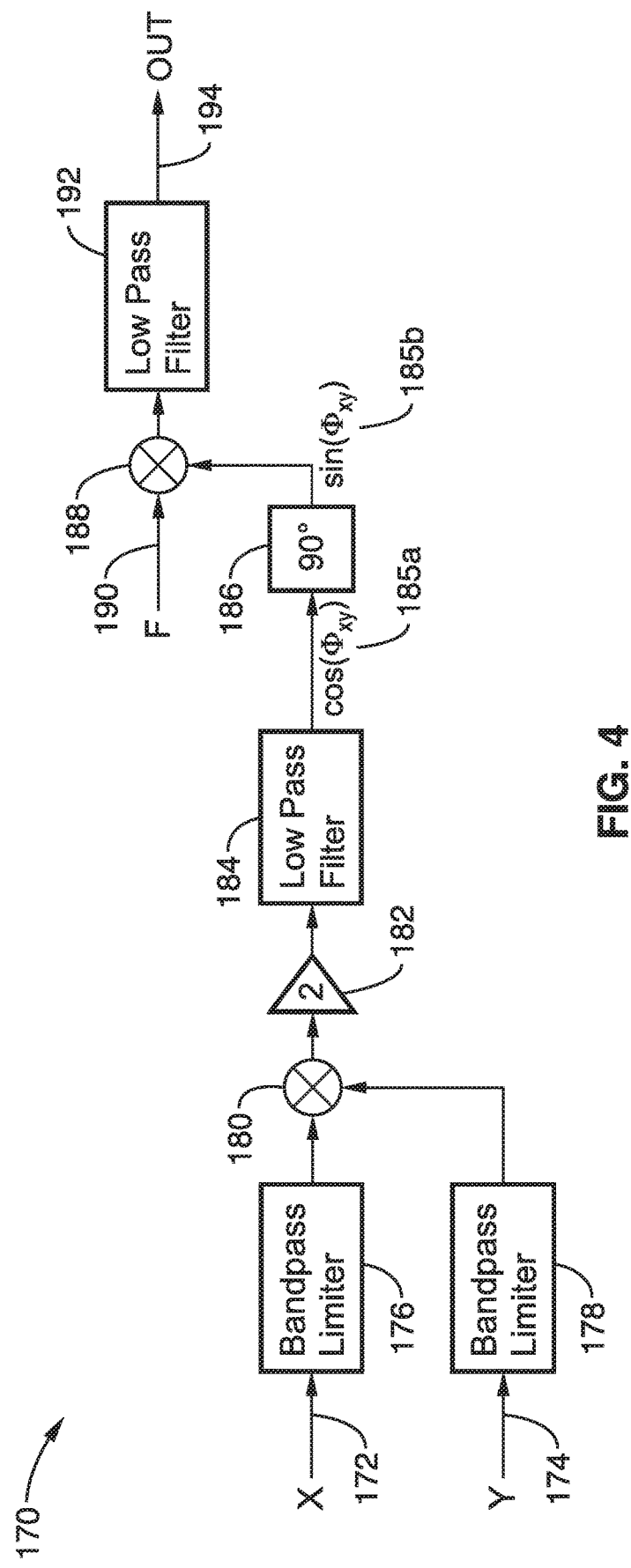
FIG. 4 is a block diagram of a phase extractor utilized according to at least one embodiment of the present disclosure.

FIG. 4 illustrates an example embodiment 170 of a circuit for extracting signals $\cos \Phi_{xy}$ and $\sin \Phi_{xy}$ needed for demodulating $\Omega_{AM\_m}$ and $\Omega_{FM\_m}$. The axis oscillation signals X=x(t) 172 and Y=y(t) 174 are fed into respective band-pass limiters 176, 178 to remove amplitude information. The resulting axis oscillation signals, without amplitude information ($\cos \Phi_{xy}$ and $\sin \Phi_{xy}$) are then multiplied at multiplier 180, then multiplied 182 by a constant, seen here as multiplication by the value 2, then passed through a low-pass filter 184, resulting in a signal $\cos \Phi_{xy}$, 185a equal to the cosine of the phase difference between the inputs. Low-pass filter 184 removes the image at the sum of the input frequencies created by the multiplication. The low pass filtered signal is then phase shifted by 90 degrees at a phase shifter 186, to construct the rate reference $\sin \Phi_{xy}$ 185b for FM readout. With references $\cos \Phi_{xy}$ and $\sin \Phi_{xy}$ being known, angular rate can then be determined from $\Omega_{FM\_m}$ and $\Omega_{AM\_m}$.

The rate reference 185b is multiplied at multiplier 188 by $\Omega_{FM\_m}$ (190 in FIGS. 4 and 112 in FIG. 3) and the result is filtered at low-pass filter 192 to produce a final output 194. The low-pass filter removes wide-band noise and errors. The system used for producing the angular rate from the oscillation frequency and rate reference is referred to as the rate demodulator.

Figure 5:
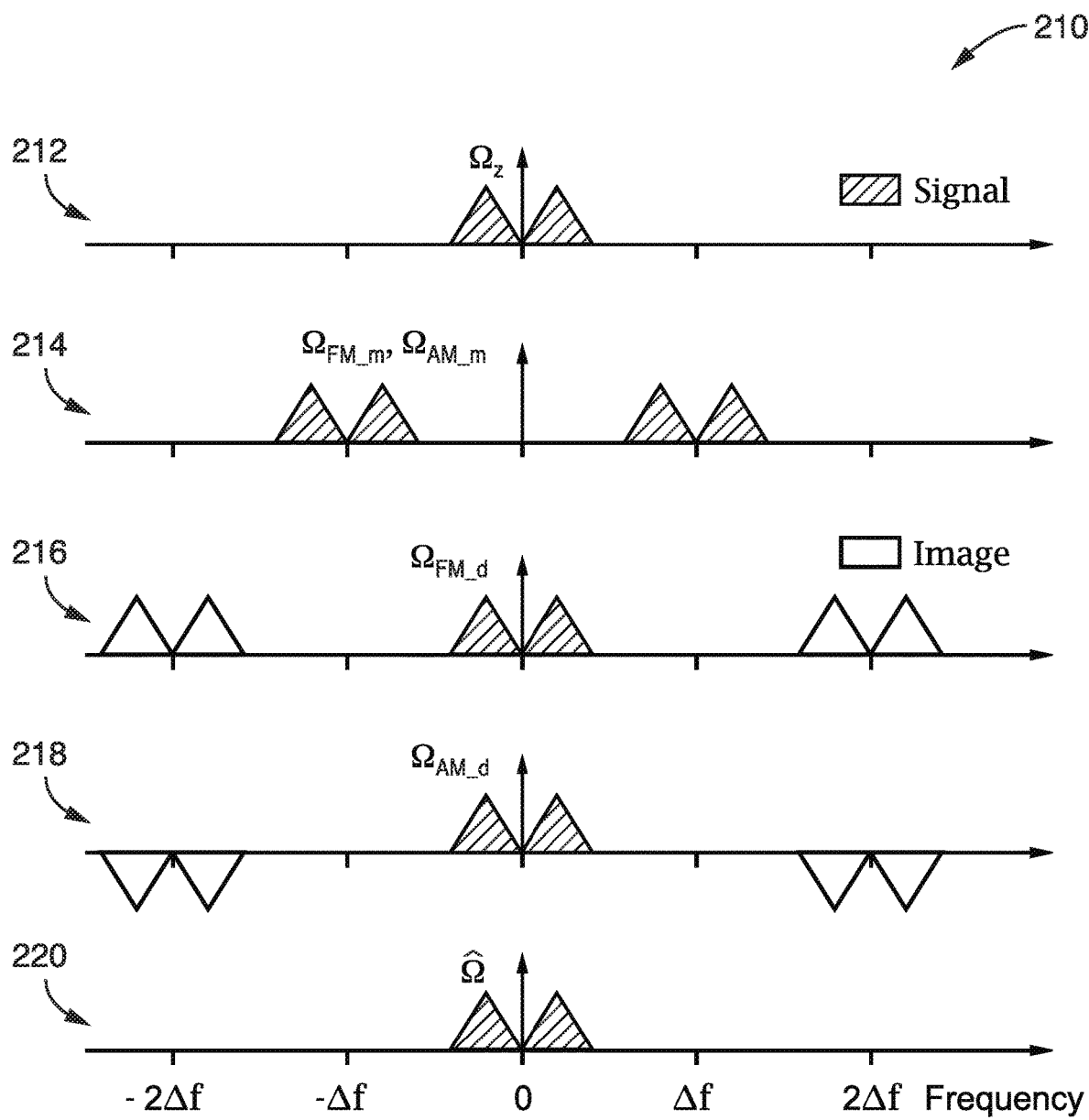
FIG. 5 is a spectrum plot of gyroscope rate input $\Omega_z$, modulated and demodulated rate spectra, and measured rate output, as found according to an embodiment of the present disclosure.

FIG. 5 illustrates an example embodiment 210 showing amplitudes of assumed two-sided spectra of the rotation signal $\Omega_z$ (angular rate) 212 and the frequency $\Omega_{FM\_m}$ and amplitude $\Omega_{AM\_m}$ 214 of the envelope of the modes. The latter are shifted by the relative phase $\Phi_{xy}$ of x and y:

$$\Omega_{FM\_m} = \Omega_z \sin \Phi_{xy}$$

$$\Omega_{AM\_m} = \Omega_z \cos \Phi_{xy}$$

where $\Phi_{xy} \cong \Delta \omega \cdot t$ and $\Delta \omega = 2\pi \Delta f$ is the frequency difference between the resonant frequencies of the x and y modes. The signals $\Omega_{FM\_m}$ and $\Omega_{AM\_m}$ are in quadrature, differing only by their phase, and are therefore not shown individually. The demodulated signals $$\Omega_{FM\_d} = \Omega_{FM\_m} \sin \Phi_{xy}$$

$$\Omega_{AM\_d} = \Omega_{AM\_m} \cos \Phi_{xy}$$

comprise the rotation signal $\Omega_z$ plus spectra at $\pm 2\Delta f$ known in the art as image spectra or spectral images and a well known artifact of AM modulation by those skilled in the art.

The unknown rate $\hat{\Omega}$ 220 can be obtained by low-pass filtering either $\Omega_{FM\_d}$ 216 or $\Omega_{AM\_d}$ 218, or more preferably by summation, thus exploiting the opposite polarity of the image frequencies in $\Omega_{FM\_d}$ or $\Omega_{AM\_d}$:

$$\hat{\Omega} = \Omega_{FM\_d} + \Omega_{AM\_d} = \Omega_z$$

Figure 6:
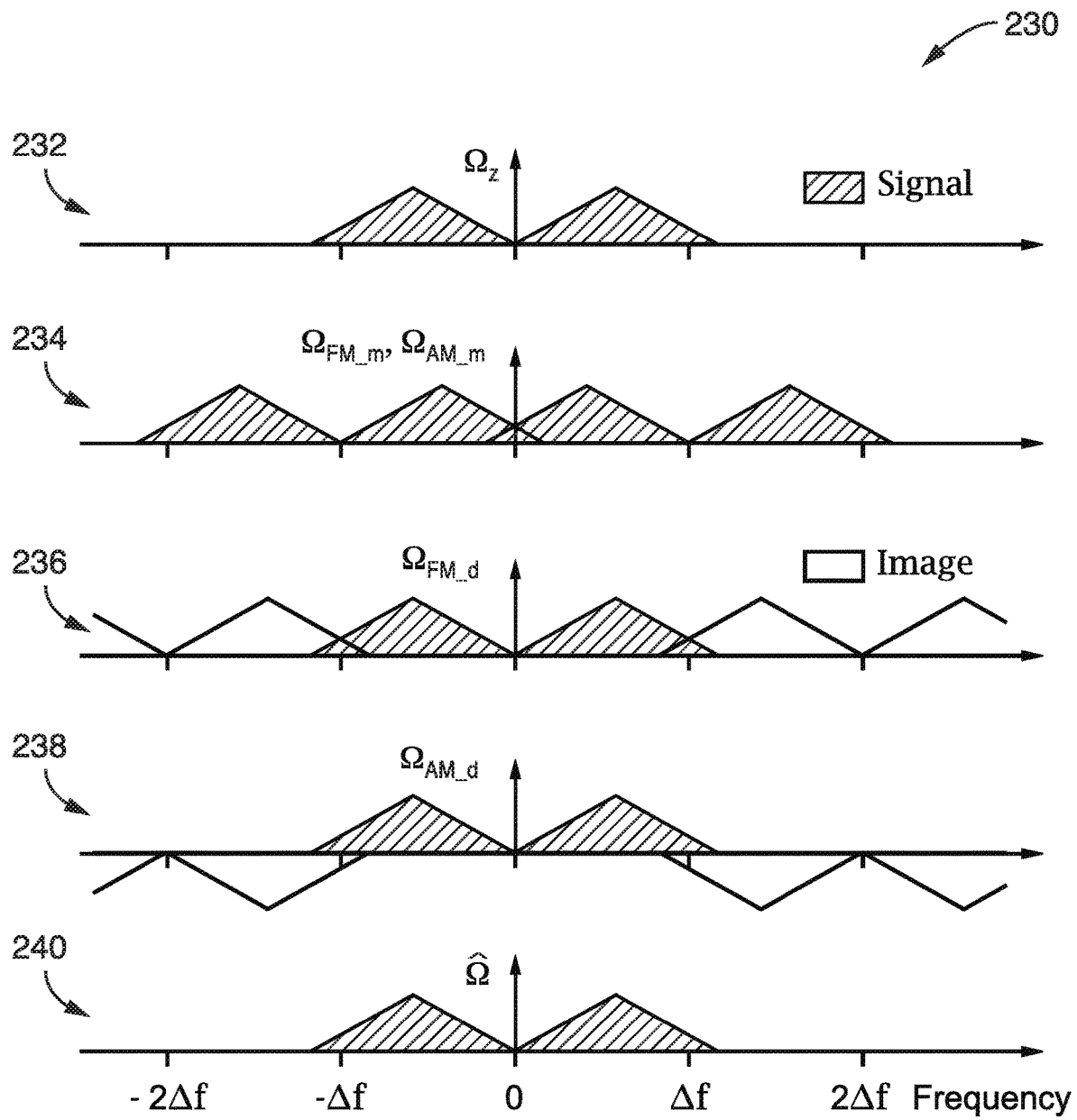
FIG. 6 is a spectrum plot of gyroscope rate input $\Omega_z$ with bandwidth greater than the frequency split on the x and y modes, as utilized according to an embodiment of the present disclosure.

FIG. 6 illustrates an example embodiment 230 which shows the same spectra as FIG. 5, but for the case where the bandwidth BW of $\Omega_z$ 232 is greater than $\Delta f$. The overlap of the desired signal spectra of $\Omega_{FM\_m}$ and $\Omega_{AM\_m}$ 234 and their spectral images amounts to signal corruption, also known in the art as aliasing. The demodulated signals $\Omega_{FM\_d}$ 236 and $\Omega_{AM\_m}$ 238 suffer from the same problem and are therefore not a correct measure of the unknown rate $\Omega_z$.

One solution for addressing this problem is to increase the frequency split between modes x and y. This, however, has adverse effects on gyroscope performance, for example resulting in an increase of the short term noise, also called angular random walk (ARW). Alternatively, if rate is extracted from the sum of $\Omega_{FM\_d}$ and $\Omega_{AM\_m}$, as suggested above, the images from $\Omega_{FM\_d}$ and $\Omega_{AM\_d}$ cancel due to the quadrature nature of $\Omega_{FM\_m}$ and $\Omega_{AM\_m}$ resulting in a rate estimate $\hat{\Omega}$ 240, where $\hat{\Omega} = \Omega_z$, that is free from aliasing errors, thus removing the bandwidth restriction to rates. Hence rates with frequencies greater than $\Delta f$ are correctly measured.

Practical implementations suffer from errors that should be eliminated to maximize gyroscope performance. For example, the amplitudes of $\Omega_{FM\_d}$ and $\Omega_{AM\_d}$ should be matched precisely for the images to be cancelled accurately. Another error results from slowly varying noise components $\Omega_{\varepsilon_{FM}}$ and $\Omega_{\varepsilon_{AM}}$ being added by the sustaining circuits and amplitude and frequency measurement circuitry as well as imperfect extraction of the relative phase $\Phi_{xy}$ used for demodulation. Yet another error results from undesired quadrature motion $\Omega_{q\_FM}$ and $\Omega_{d\_AM}$ in the x and y modes that are modulated to the same frequency as the signal $\Omega_z$ but 90 degrees phase shifted. With these errors added, the equations for the modulated FM and AM rate become:

$$\Omega_{FM\_m} = \underbrace{\Omega_z \sin \Phi_{xy}}_{signal} + \underbrace{\Omega_{\varepsilon_{FM}} + \Omega_{q\_FM} \cos \Phi_{xy}}_{error}$$

$$\Omega_{AM\_m} = \underbrace{\Omega_z \cos \Phi_{xy}}_{signal} + \underbrace{\Omega_{\varepsilon_{AM}} + \Omega_{q\_AM} \sin \Phi_{xy}}_{error}$$

Figure 7:
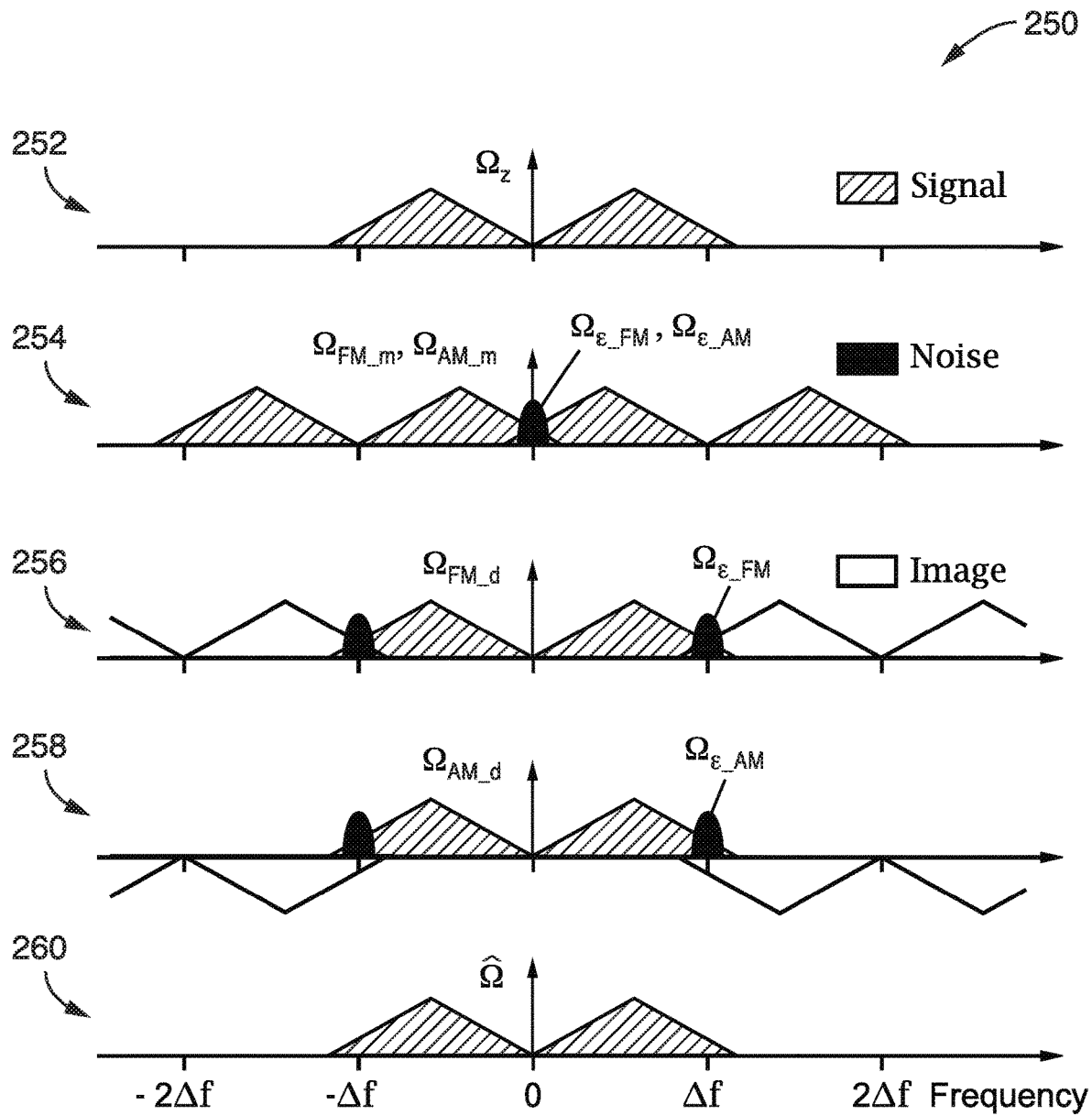
FIG. 7 is a spectrum plot of FIG. 6, shown here with additional noise spectra representing errors in practical gyroscope realizations.

FIG. 7 illustrates an example embodiment 250 which shows the same spectra as FIG. 6, with bandwidth of $\Omega_z$ 252 greater than $\Delta f$, an overlap spectra of $\Omega_{FM\_m}$ and $\Omega_{AM\_m}$ 254, demodulated signals $\Omega_{FM\_d}$ 256 and $\Omega_{AM\_m}$ 258, and unknown rate $\hat{\Omega}$ 260. However, this figure assumes added noise spectra $\Omega_{\varepsilon_{FM}}$ and $\Omega_{\varepsilon_{AM}}$. Demodulation shifts these errors to $\Delta f$, which for BW>$\Delta f$ is inside the useful signal band and therefore results in corruption:

$$\Omega_{FM\_d} = \Omega_{FM\_m} \sin \Phi_{xy}$$
$$= \frac{\Omega_z}{2} - \frac{\Omega_z}{2} \cos 2\Phi_{xy} + \Omega_{\varepsilon_{FM}} \sin \Phi_{xy} + \frac{\Omega_{q\_FM}}{2} \sin 2\Phi_{xy}$$

$$\Omega_{AM\_d} = \Omega_{AM\_m} \cos \Phi_{xy}$$
$$= \frac{\Omega_z}{2} + \frac{\Omega_z}{2} \cos 2\Phi_{xy} + \Omega_{\varepsilon_{AM}} \cos \Phi_{xy} + \frac{\Omega_{q\_AM}}{2} \sin 2\Phi_{xy}$$

Adding these demodulated signals gives an estimate $\hat{\Omega}_z$ of the rate signal $\Omega_z$:

$$\hat{\Omega}_z = \Omega_{FM\_d} + \Omega_{AM\_d} \quad (1)$$

$$= \Omega_z + \underbrace{\Omega_{\varepsilon_{FM}}\sin\Phi_{xy} + \Omega_{\varepsilon_{AM}}\cos\Phi_{xy} + \frac{\Omega_{q\_FM} + \Omega_{q\_AM}}{2}\sin2\Phi_{xy}}_{error}$$

The error can be calculated as follows:

$$\Omega_{FM\_m}\cos\Phi_{xy} = \frac{\Omega_z}{2}\sin2\Phi_{xy} + \Omega_{\varepsilon_{FM}}\cos\Phi_{xy} + \frac{\Omega_{q\_FM}}{2} + \frac{\Omega_{q\_FM}}{2}\cos2\Phi_{xy}$$

$$\Omega_{AM\_m}\sin\Phi_{xy} = \frac{\Omega_z}{2}\sin2\Phi_{xy} + \Omega_{\varepsilon_{AM}}\sin\Phi_{xy} + \frac{\Omega_{q\_AM}}{2} - \frac{\Omega_{q\_AM}}{2}\cos2\Phi_{xy}$$

Subtracting the two equation yields:

$$\Omega_{FM\_m}\cos\Phi_{xy} - \Omega_{AM\_m}\sin\Phi_{xy} = \underbrace{\frac{\Omega_{q\_FM} - \Omega_{q\_AM}}{2}}_{quadrature\ leakage} + \quad (2)$$

$$\underbrace{\Omega_{\varepsilon_{FM}}\cos\Phi_{xy} - \Omega_{\varepsilon_{AM}}\sin\Phi_{xy} + \frac{\Omega_{q\_FM} + \Omega_{q\_AM}}{2}\cos2\Phi_{xy}}_{error}$$

The error term in Eq. (2) equals the error in Eq. (1) shifted 90 degrees. An error-free estimate $\hat{\Omega}_z$ of the rate signal $\Omega_z$ is obtained by high-pass HPF[•] filtering after performing Eq. (2) to remove the quadrature leakage term, applying the Hilbert transform H{ } to shift the remainder by 90 degrees phase, and subtracting the result from Eq. (1):

$$\hat{\Omega}_z = \Omega_{FM\_d} + \Omega_{AM\_d} - H\{HPF[\Omega_{FM\_m}\cos\Phi_{xy} - \Omega_{AM\_m}\sin\Phi_{xy}]\} = \Omega_z$$

Although this, in principle, results in an error-free output, practical implementations suffer from residual errors caused by temperature variations. It would therefore be useful to know the precise temperature of the transducer proof-mass to cancel these errors. The relationship between temperature and errors can be established for example based on precise experimental characterization of the device in the factory.

Transducers fabricated from materials such as Silicon or Quartz exhibit well known variations of resonant frequency as a function of device temperature. The error $\Omega_{\varepsilon_{FM}}$ in Eq. (2) above includes the resonant frequency variation and is therefore a precise proxy for device temperature. It can be obtained from Eq. (2) from synchronous demodulation with cos $\Phi_{xy}$ and used in a temperature cancellation circuit that reduces residual gyroscope errors due to temperature variations.

The enhancements described in the presented technology can be readily implemented within various gyroscope hardware configurations, a number of which are implemented to include one or more computer processor devices (e.g., digital signal processor (DSP), central processing unit (CPU), microprocessor, microcontroller, computer enabled application specific integrated circuit (ASIC), etc.) and associated memory storing instructions (e.g., RAM, DRAM, FRAM, NVRAM, FLASH, computer readable media, etc.) whereby programming (instructions) stored in the memory are executed on the processor to perform the steps of the various process methods described herein. The presented technology is non-limiting with regard to the use of processors, memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An electromechanical system, comprising: (a) a mechanical resonator having a first mode of vibration and an associated first natural frequency, and a second mode of vibration having an associated second natural frequency, wherein angular rate of motion input couples energy between said first mode of vibration and said second mode of vibration; (b) sensors and actuators for each of said first mode and said second mode for transducing an electrical signal into a mechanical vibration and transducing a mechanical vibration into an electrical signal; (c) sustaining circuitry connected to the actuators to maintain vibrations in the first mode at a first frequency and the second mode at the second frequency; (d) an amplitude and frequency measurement circuit configured for determining the instantaneous amplitude and frequency variation and outputting modulated versions of mode vibration amplitude and frequency as a representation of vibration amplitude and frequency; (e) a phase determination circuit configured for receiving mode vibration signals and generating rate reference signals, and outputting demodulated frequency and amplitude rate signals; (f) a processing element configured for combining demodulated frequency and amplitude rate signals to generate an output rate in which the image spectra of the demodulation are eliminated from the angular rate determination.

2. The apparatus, system or method of any preceding or following embodiment, wherein said electromechanical system comprises a continuous mode reversal gyroscope.

3. The apparatus, system or method of any preceding or following embodiment, wherein said gyroscope is configured with a proof mass configured to move along at least two orthogonal axes.

4. The apparatus, system or method of any preceding or following embodiment, wherein said proof mass is suspended by springs.

5. The apparatus, system or method of any preceding or following embodiment, wherein said mechanical resonator comprises a gyroscope transducer.

6. The apparatus, system or method of any preceding or following embodiment, wherein said mechanical resonator is symmetric with respect to Coriolis coupled vibration modes.

7. The apparatus, system or method of any preceding or following embodiment, wherein said first natural frequency and said second natural frequency of said mechanical resonator differs by a range of approximately 1 to 100 Hz.

8. The apparatus, system or method of any preceding or following embodiment, wherein said mechanical resonator is manufactured or trimmed to achieve said difference between said first natural frequency and said second natural frequency, or a phase frequency control circuit is utilized which is configured to determined these natural frequencies and make adjustments to operation the mechanical resonator.

9. The apparatus, system or method of any preceding or following embodiment, wherein said system is configured to infer an angular rate of motion from the gains of the sustaining circuitry, the frequency of vibration of the first mode, and the frequency of vibration of the second mode.

10. The apparatus, system or method of any preceding or following embodiment, wherein said system is configured to infer an angular rate of motion from the sum of the gains of the sustaining circuitry and the frequencies of vibration of the first mode and the frequency of vibration of the second mode.

11. The apparatus, system or method of any preceding or following embodiment, wherein said system is configured to infer an estimate of the errors of the inferred angular rate from gains of the sustaining circuitry and the frequencies of vibration of the first mode and the second mode, and subtracting this estimate from the inferred output rate.

12. The apparatus, system or method of any preceding or following embodiment, further comprising a circuit configured for estimating temperature of the mechanical resonator from an estimate of the errors of the inferred angular rate.

13. The apparatus, system or method of any preceding or following embodiment, further comprising a circuit configured to compensate for errors due to variations in the temperature of the mechanical resonator using the temperature estimate.

14. An electromechanical system, comprising: (a) a mechanical resonator having a first mode of vibration and an associated first natural frequency, and a second mode of vibration having an associated second natural frequency, wherein angular rate of motion input couples energy between said first mode of vibration and said second mode of vibration; (b) sensors and actuators for each of the first mode and second mode of vibration for transducing an electrical signal into a mechanical vibration and transducing a mechanical vibration into an electrical signal; (c) sustaining circuitry with variable gains connected to the actuators to maintain vibrations in the first mode and the second mode with gains adjusted to maintain substantially constant, non-zero velocity amplitude vibrations in the first mode at the first frequency of vibration and the second mode at the second frequency of vibration; (d) an amplitude and frequency measurement circuit configured for determining the instantaneous amplitude and frequency variation and outputting modulated versions of mode vibration amplitude and frequency as a representation of vibration amplitude and frequency; (e) a phase determination circuit configured for receiving mode vibration signals and generating rate reference signals, and outputting demodulated frequency and amplitude rate signals; (f) output circuitry to infer an angular rate of motion in response to combining demodulated frequency and amplitude rate signals to generate an output rate in which the image spectra of the demodulation are eliminated from the angular rate determination.

15. The apparatus, system or method of any preceding or following embodiment, wherein said electromechanical system comprises a continuous mode reversal gyroscope.

16. The apparatus, system or method of any preceding or following embodiment, wherein said gyroscope is configured with a proof mass configured to move along at least two orthogonal axes.

17. The apparatus, system or method of any preceding or following embodiment, wherein said proof mass is suspended by springs.

18. The apparatus, system or method of any preceding or following embodiment, wherein said mechanical resonator comprises a gyroscope transducer.

19. The apparatus, system or method of any preceding or following embodiment, wherein said mechanical resonator is symmetric with respect to Coriolis coupled vibration modes.

20. The apparatus, system or method of any preceding or following embodiment, wherein said first natural frequency and said second natural frequency differ by a range of approximately 1 to 100 Hz.

21. The apparatus, system or method of any preceding or following embodiment, wherein said mechanical resonator is manufactured or trimmed to achieve said difference between said first natural frequency and said second natural frequency, or a phase frequency control circuit is utilized which is configured to determined these natural frequencies and make adjustments to operation the mechanical resonator.

22. The apparatus, system or method of any preceding or following embodiment, wherein said output circuitry is configured to infer an angular rate of motion from the gains of the sustaining circuitry, and the frequency of vibration of the first mode and the second mode.

23. The apparatus, system or method of any preceding or following embodiment, wherein said output circuitry is configured to infer an angular rate of motion from a sum of the gains of the sustaining circuitry and the frequencies of vibration of the first mode and second mode.

24. The apparatus, system or method of any preceding or following embodiment, wherein said output circuitry is configured to infer an estimate of the errors of the inferred angular rate from the gains of the sustaining circuitry and the frequencies of vibration of the first and second mode and subtracting this estimate from the inferred angular rate.

25. The apparatus, system or method of any preceding or following embodiment, further comprising a circuit configured for estimating the temperature of the electromechanical system from the estimate of the errors of inferred angular rate.

26. The apparatus, system or method of any preceding or following embodiment, further comprising a circuit configured for compensating for errors due to variations of the temperature of the electromechanical system using the temperature estimate.

27. A method of determining angular rate in a gyroscope, comprising: (a) transducing an electrical signal into a mechanical vibration of a mechanical resonator having a first mode of vibration and an associated first natural frequency, and a second mode of vibration having an associated second natural frequency, in which angular rate of motion input couples energy between said first mode of vibration and said second mode of vibration; (b) transducing the mechanical vibration of said mechanical resonator into an electrical signal; (c) maintaining vibrations of said mechanical resonator in the first mode at a first frequency and the second mode at the second frequency; (d) determining instantaneous amplitude and frequency variation and outputting modulated versions of mode vibration amplitude and frequency as a representation of vibration amplitude and frequency; (e) receiving mode vibration signals and generating rate reference signals, and outputting demodulated frequency and amplitude rate signals; and (f) combining demodulated frequency and amplitude rate signals to generate an output rate in which the image spectra of the demodulation are eliminated from the angular rate determination.

28. An electromechanical system, comprising: (a) a mechanical resonator having a first mode of vibration and an associated first natural frequency, and a second mode of vibration having an associated second natural frequency, wherein angular rate of motion input couples energy between said first mode of vibration and second mode of vibration; (b) sensors and actuators for each of the first mode and second mode for transducing an electrical signal into a mechanical vibration and transducing a mechanical vibration into an electrical signal; (c) sustaining circuitry connected to the actuators to maintain vibrations in the first mode at a first frequency and the second mode at the second frequency; and (d) output circuitry to infer an angular rate of motion from the amplitude of vibration of first mode of vibration and second mode of vibration.

29. An electromechanical system, comprising: (a) a mechanical resonator having a first mode of vibration and an associated first natural frequency, and a second mode of vibration having an associated second natural frequency, wherein angular rate of motion input couples energy between said first mode of vibration and second mode of vibration; (b) sensors and actuators for each of the first mode and second mode for transducing an electrical signal into a mechanical vibration and transducing a mechanical vibration into an electrical signal; (c) sustaining circuitry with variable gains connected to the actuators to maintain vibrations in the first mode at a first frequency and the second mode at the second frequency with the gains adjusted to maintain substantially constant, non-zero velocity amplitude vibrations in the first mode at a first frequency and the second mode at a second frequency; and (d) output circuitry to infer an angular rate of motion from the gains of the sustaining circuitry.

30. The apparatus, system or method of any preceding or following embodiment, with output circuitry to infer an angular rate of motion from the gains of the sustaining circuitry, the frequency of vibration of the first mode, and the frequency of vibration of the second mode.

31. The apparatus, system or method of any preceding or following embodiment, with output circuitry to infer an angular rate of motion from the sum of the gains of the sustaining circuitry and the frequencies of vibration of the first and second mode.

32. The apparatus, system or method of any preceding or following embodiment, with output circuitry to infer an estimate of the errors of the inferred angular rate from the gains of the sustaining circuitry and the frequencies of vibration of the first and second mode and subtracting this estimate from the inferred angular rate.

33. The apparatus, system or method of any preceding or following embodiment, with circuitry to estimate the temperature of the mechanical system from the estimate of the errors.

34. The apparatus, system or method of any preceding or following embodiment, with circuitry to compensate for errors due to variations of the temperature of the mechanical system using the temperature estimate.

35. In a FM gyroscope of the type having a proof mass that is suspended by springs and is free to move along two orthogonal axes or a ring, or similar structure, wherein vibration of the mass can on occur on both axes simultaneously, and wherein a bias error shifting method is used to modulate bias error to a higher frequency where it can be removed by a filter, the improvement comprising using both AM and FM information from the gyroscope transducer to overcome limitation of useable signal bandwidth to less than the modulation frequency.

36. The apparatus, system or method of any preceding or following embodiment, wherein modulation with the cos and sin terms, respectively, limit the usable bandwidth of either signal; and wherein combining the two outputs (cos and sin terms) eliminates this bandwidth restriction.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An electromechanical system, comprising:
   a mechanical resonator having a first mode of vibration and an associated first natural frequency, and a second mode of vibration having an associated second natural frequency, wherein angular rate of motion input couples energy between said first mode of vibration and said second mode of vibration;
   sensors and actuators for each of said first mode and said second mode for transducing an electrical signal into a mechanical vibration and transducing a mechanical vibration into an electrical signal;
   sustaining circuitry connected to the actuators to maintain vibrations in the first mode at a first frequency and the second mode at the second frequency;
   an amplitude and frequency measurement circuit configured for determining the instantaneous amplitude and frequency variation and outputting modulated versions of mode vibration amplitude and frequency as a representation of vibration amplitude and frequency;
   a phase determination circuit configured for receiving mode vibration signals and generating rate reference signals, and outputting demodulated frequency and amplitude rate signals; and
   a processing element configured for summing demodulated frequency and amplitude rate signals to generate an output rate in which the image spectra of the demodulation are eliminated from the angular rate determination, by exploiting the opposite polarity of the image spectra during summing.

2. The electromechanical system as recited in claim 1, wherein said electromechanical system comprises a continuous mode reversal gyroscope.

3. The electromechanical system as recited in claim 2, wherein said gyroscope is configured with a proof mass configured to move along at least two orthogonal axes.

4. The electromechanical system as recited in claim 2, wherein said proof mass is suspended by springs.

5. The electromechanical system as recited in claim 1, wherein said mechanical resonator comprises a gyroscope transducer.

6. The electromechanical system as recited in claim 1, wherein said mechanical resonator is symmetric with respect to Coriolis coupled vibration modes.

7. The electromechanical system as recited in claim 1, wherein said first natural frequency and said second natural frequency of said mechanical resonator differs by a range of approximately 1 to 100 Hz.

8. The electromechanical system as recited in claim 7, wherein said mechanical resonator is manufactured or trimmed to achieve said difference between said first natural frequency and said second natural frequency, or a phase frequency control circuit is utilized which is configured to determine these natural frequencies and make adjustments to operation the mechanical resonator.

9. The electromechanical system as recited in claim 1, wherein said system is configured to infer an angular rate of motion from the gains of the sustaining circuitry, the frequency of vibration of the first mode, and the frequency of vibration of the second mode.

10. The electromechanical system as recited in claim 1, wherein said system is configured to infer an angular rate of motion from the sum of the gains of the sustaining circuitry and the frequencies of vibration of the first mode and the frequency of vibration of the second mode.

11. The electromechanical system as recited in claim 1, wherein said system is configured to infer an estimate of the errors of the inferred angular rate from gains of the sustaining circuitry and the frequencies of vibration of the first mode and the second mode, and subtracting this estimate from the inferred output rate.

12. The electromechanical system as recited in claim 11, further comprising a circuit configured for estimating temperature of the mechanical resonator from an estimate of the errors of the inferred angular rate.

13. The electromechanical system as recited in claim 12, further comprising a circuit configured to compensate for errors due to variations in the temperature of the mechanical resonator using the temperature estimate.

14. An electromechanical system, comprising:
a mechanical resonator having a first mode of vibration and an associated first natural frequency, and a second mode of vibration having an associated second natural frequency, wherein angular rate of motion input couples energy between said first mode of vibration and said second mode of vibration;
sensors and actuators for each of the first mode and second mode of vibration for transducing an electrical signal into a mechanical vibration and transducing a mechanical vibration into an electrical signal;
sustaining circuitry with variable gains connected to the actuators to maintain vibrations in the first mode and the second mode with gains adjusted to maintain substantially constant, non-zero velocity amplitude vibrations in the first mode at the first frequency of vibration and the second mode at the second frequency of vibration;
an amplitude and frequency measurement circuit configured for determining the instantaneous amplitude and frequency variation and outputting modulated versions of mode vibration amplitude and frequency as a representation of vibration amplitude and frequency;
a phase determination circuit configured for receiving mode vibration signals and generating rate reference signals, and outputting demodulated frequency and amplitude rate signals; and
output circuitry to infer an angular rate of motion in response to summing demodulated frequency and amplitude rate signals to generate an output rate in which the image spectra of the demodulation are eliminated from the angular rate determination, by exploiting the opposite polarity of the image spectra during summing.

15. The electromechanical system as recited in claim 14, wherein said electromechanical system comprises a continuous mode reversal gyroscope.

16. The electromechanical system as recited in claim 15, wherein said gyroscope is configured with a proof mass configured to move along at least two orthogonal axes.

17. The electromechanical system as recited in claim 15, wherein said proof mass is suspended by springs.

18. The electromechanical system as recited in claim 14, wherein said mechanical resonator comprises a gyroscope transducer.

19. The electromechanical system as recited in claim 14, wherein said mechanical resonator is symmetric with respect to Coriolis coupled vibration modes.

20. The electromechanical system as recited in claim 14, wherein said first natural frequency and said second natural frequency differ by a range of approximately 1 to 100 Hz.

21. The electromechanical system as recited in claim 20, wherein said mechanical resonator is manufactured or trimmed to achieve said difference between said first natural frequency and said second natural frequency, or a phase frequency control circuit is utilized which is configured to determined these natural frequencies and make adjustments to operation the mechanical resonator.

22. The electromechanical system as recited in claim 14, wherein said output circuitry is configured to infer an angular rate of motion from the gains of the sustaining circuitry, and the frequency of vibration of the first mode and the second mode.

23. The electromechanical system as recited in claim 14, wherein said output circuitry is configured to infer an angular rate of motion from a sum of the gains of the sustaining circuitry and the frequencies of vibration of the first mode and second mode.

24. The electromechanical system as recited in claim 23, wherein said output circuitry is configured to infer an estimate of the errors of the inferred angular rate from the gains of the sustaining circuitry and the frequencies of vibration of the first and second mode and subtracting this estimate from the inferred angular rate.

25. The electromechanical system as recited in claim 24, further comprising a circuit configured for estimating the temperature of the electromechanical system from the estimate of the errors of inferred angular rate.

26. The electromechanical system as recited in claim 25, further comprising a circuit configured for compensating for errors due to variations of the temperature of the electromechanical system using the temperature estimate.

* * * * *